(12) United States Patent
Roffe (10) Patent No.: US 12,228,174 B2
(45) Date of Patent: Feb. 18, 2025

(54) BEARING ASSEMBLY WITH A RETAINER

(71) Applicant: Schaeffler Technologies AG & Co. KG, Herzogenaurach (DE)

(72) Inventor: Dennis Roffe, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 151 days.

(21) Appl. No.: 18/064,545

(22) Filed: Dec. 12, 2022

(65) Prior Publication Data

US 2024/0191756 A1 Jun. 13, 2024

(51) Int. Cl.
*F16C 35/067* (2006.01)

(52) U.S. Cl.
CPC .................. *F16C 35/067* (2013.01)

(58) Field of Classification Search
CPC ...... F16C 35/047; F16C 35/06; F16C 35/062; F16C 35/067
See application file for complete search history.

(56) References Cited

U.S. PATENT DOCUMENTS

| | | | | |
|---|---|---|---|---|
| 1,699,330 A | * | 1/1929 | Gayman | F16C 35/073 384/584 |
| 3,520,580 A | * | 7/1970 | Simmers | F16C 35/047 384/584 |
| 8,052,331 B2 | * | 11/2011 | Katougi | F16C 33/586 384/537 |
| 2009/0034896 A1 | * | 2/2009 | Fisher | F16C 35/067 384/531 |
| 2011/0103731 A1 | * | 5/2011 | Fahrni | F16C 19/364 384/572 |

FOREIGN PATENT DOCUMENTS

FR 710524 A * 8/1931

\* cited by examiner

*Primary Examiner* — James Pilkington
(74) *Attorney, Agent, or Firm* — Price Heneveld LLP (57) ABSTRACT

A bearing assembly includes a housing having an annular interior portion, a bearing disposed radially inboard of the annular interior portion and operable to move axially along the annular interior portion, a first retainer operable between an assembled condition, wherein the first retainer extends axially along the annular interior portion a first distance, and a removed condition, and a second retainer operable between an assembled condition, wherein the second retainer extends axially along the annular interior portion a second distance, and a removed condition.

15 Claims, 5 Drawing Sheets

BEARING ASSEMBLY WITH A RETAINER

FIELD OF THE DISCLOSURE

The present disclosure generally relates to a bearing assembly. More particularly, the present disclosure relates to a bearing assembly that includes a retainer.

BACKGROUND OF THE DISCLOSURE

Some bearing assemblies utilize internal retention rings that limit axial movement of certain components of the bearing assemblies. Internal retention rings can be difficult to remove and may require tools for insertion and/or removal.

SUMMARY OF THE DISCLOSURE

According to a first aspect of the present disclosure, a bearing assembly includes a housing having an annular interior portion. The bearing assembly also includes a bearing disposed radially inboard of the annular interior portion and operable to move axially along the annular interior portion. The bearing includes an inner ring, an outer ring, and a plurality of rolling elements disposed radially between the inner and outer rings. The bearing assembly also includes a first retainer operable between an assembled condition and a removed condition. In the assembled condition, the first retainer is coupled to the housing, the first retainer extends axially along the annular interior portion of the housing a first distance, and the first retainer limits axial displacement of the bearing along the annular interior portion of the housing. In the removed condition, axial displacement of the bearing along the annular interior portion of the housing is uninhibited by the first retainer. Further, the bearing assembly includes a second retainer operable between an assembled condition and a removed condition. In the assembled condition, the second retainer is coupled to the housing, the second retainer extends axially along the annular interior portion of the housing a second distance, and the second retainer limits axial displacement of the bearing along the annular interior portion of the housing. In the removed condition, axial displacement of the bearing along the annular interior portion of the housing is uninhibited by the second retainer.

Embodiments of the first aspect of the disclosure can include any one or a combination of the following features:
the first distance is substantially equal to the second distance;
the first distance is greater than the second distance;
in the assembled condition of the first retainer, the first retainer limits axial displacement of the bearing along the annular interior portion of the housing in a first axial direction to a first amount, and in the assembled condition of the second retainer, the second retainer limits axial displacement of the bearing along the annular interior portion of the housing in the first axial direction to a second amount that is greater than the first amount;
the housing further includes an outer portion that extends radially outboard from the annular interior portion, wherein the first retainer is fastened to the outer portion of the housing via a fastener in the assembled condition of the first retainer;
the first retainer includes a first portion that defines a receiver for receiving the fastener that fastens the first retainer to the outer portion of the housing, and a second portion that is adjacent to the first portion and coupled to the first portion via a first corner, wherein the second portion extends outward from the first corner in an axial direction along the annular interior portion of the housing;
the first retainer further includes a tang that extends from the second portion distally from the first portion;
the tang extends radially outboard from the second portion of the first retainer; and
the receiver is an aperture that receives a shaft of the fastener, wherein the shaft extends axially through the aperture.

According to a second aspect of the present disclosure, a bearing assembly includes a housing having an annular interior portion and an outer portion that extends radially outboard from the annular interior portion, a bearing disposed radially inboard of the annular interior portion and operable to move axially along the annular interior portion, and a first retainer. The bearing includes an inner ring, an outer ring, and a plurality of rolling elements disposed radially between the inner and outer rings. The first retainer is operable between an assembled condition and a removed condition. In the assembled condition, the first retainer is fastened to the outer portion of the housing, the first retainer extends axially along the annular interior portion of the housing a first distance, and the first retainer limits axial displacement of the bearing along the annular interior portion of the housing in a first direction to a first amount. In the removed condition, axial displacement of the bearing along the annular interior portion of the housing in the first direction is uninhibited by the first retainer.

Embodiments of the second aspect of the disclosure can include any one or a combination of the following features:
the annular interior portion of the housing defines a first channel, and a portion of the first retainer is received within the first channel in the assembled condition of the first retainer;
the first retainer includes a first portion that extends along the outer portion of the housing, a second portion that extends from the first portion along the annular interior portion of the housing, and a third portion that extends from the second portion into the first channel defined by the annular interior portion of the housing;
the first portion of the first retainer is fastened to the outer portion of the housing via a fastener;
the first portion meets the second portion at a first corner of the first retainer;
the bearing assembly includes a second retainer operable between an assembled condition, wherein the second retainer is fastened to the outer portion of the housing, the second retainer extends axially along the annular interior portion of the housing a second distance that is less than the first distance, and the second retainer limits axial displacement of the bearing along the annular interior portion of the housing in the first direction to a second amount that is greater than the first amount, and a removed condition, wherein axial displacement of the bearing along the annular interior portion of the housing in the first direction is uninhibited by the second retainer; and
the annular interior portion of the housing defines a first channel and a second channel that is in an axially-spaced relationship with the first channel, wherein a portion of the first retainer is received within the first channel in the assembled condition of the first retainer, and a portion of the second retainer is received within the second channel in the assembled condition of the second retainer.

According to a third aspect of the present disclosure, a retainer for limiting axial movement of a bearing within a housing of a bearing assembly includes a first portion that defines a receiver for receiving a fastener that is configured to fasten the first portion to the housing of the bearing assembly, and a second portion that is adjacent to the first portion and coupled to the first portion via a first corner, the second portion being configured to extend outward from the first corner in an axial direction along an annular interior portion of the housing of the bearing assembly.

Embodiments of the third aspect of the disclosure can include any one or a combination of the following features:
- the retainer includes a tang that extends from the second portion distally from the first portion;
- the tang is configured to extend radially outboard from the second portion of the retainer; and
- the receiver is an aperture configured to receive a shaft of the fastener, wherein the shaft is configured to extend axially through the aperture.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis.

Referring now to FIGS. 1-5, a bearing assembly 10 includes a housing 12. The housing 12 includes an annular interior portion 14. The bearing assembly 10 further includes a bearing 16 that is disposed radially inboard of the annular interior portion 14. The bearing 16 is operable to move axially along the annular interior portion 14 of the housing 12. The bearing 16 includes an inner ring 18, an outer ring 20, a cage 22 disposed radially between the inner and outer rings 18, 20, and a plurality of rolling elements 24 retained by the cage 22 and disposed radially between the inner and outer rings 18, 20. A first retainer 26 is operable between an assembled condition and a removed condition. In the assembled condition, the first retainer 26 is coupled to the housing 12, the first retainer 26 extends axially along the annular interior portion 14 of the housing 12 a first distance, and the first retainer 26 limits axial displacement of the bearing 16 along the annular interior portion 14 of the housing 12. In the removed condition, axial displacement of the bearing 16 along the annular interior portion 14 of the housing 12 is uninhibited by the first retainer 26. A second retainer 28 is operable between an assembled condition and a removed condition. In the assembled condition, the second retainer 28 is coupled to the housing 12, the second retainer 28 extends axially along the annular interior portion 14 of the housing 12 a second distance, and the second retainer 28 limits axial displacement of the bearing 16 along the annular interior portion 14 of the housing 12. In the removed condition, axial displacement of the bearing 16 along the annular interior portion 14 of the housing 12 is uninhibited by the second retainer 28.

Figure 1:
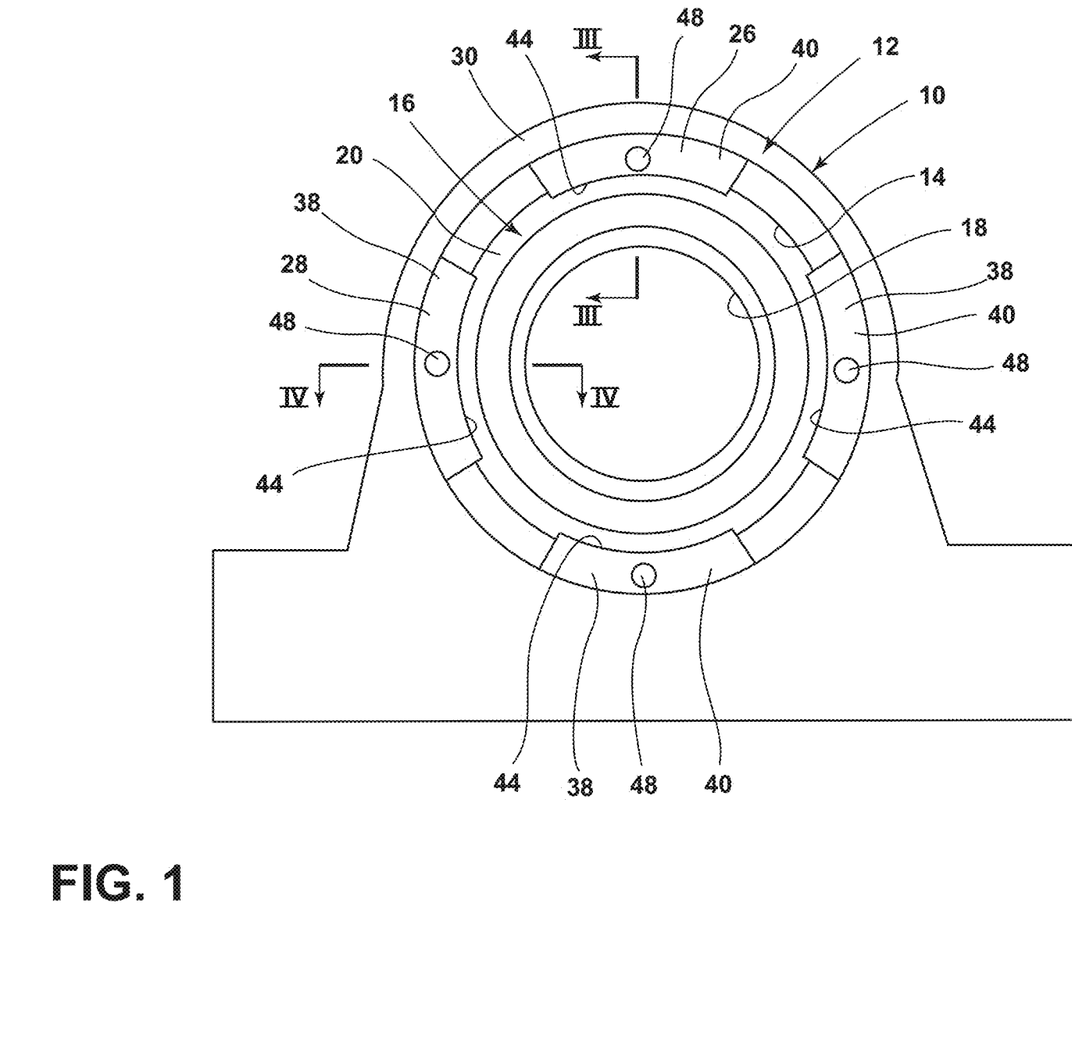
FIG. 1 is a front elevational view of a bearing assembly that includes a plurality of retainers.
Figure 2:
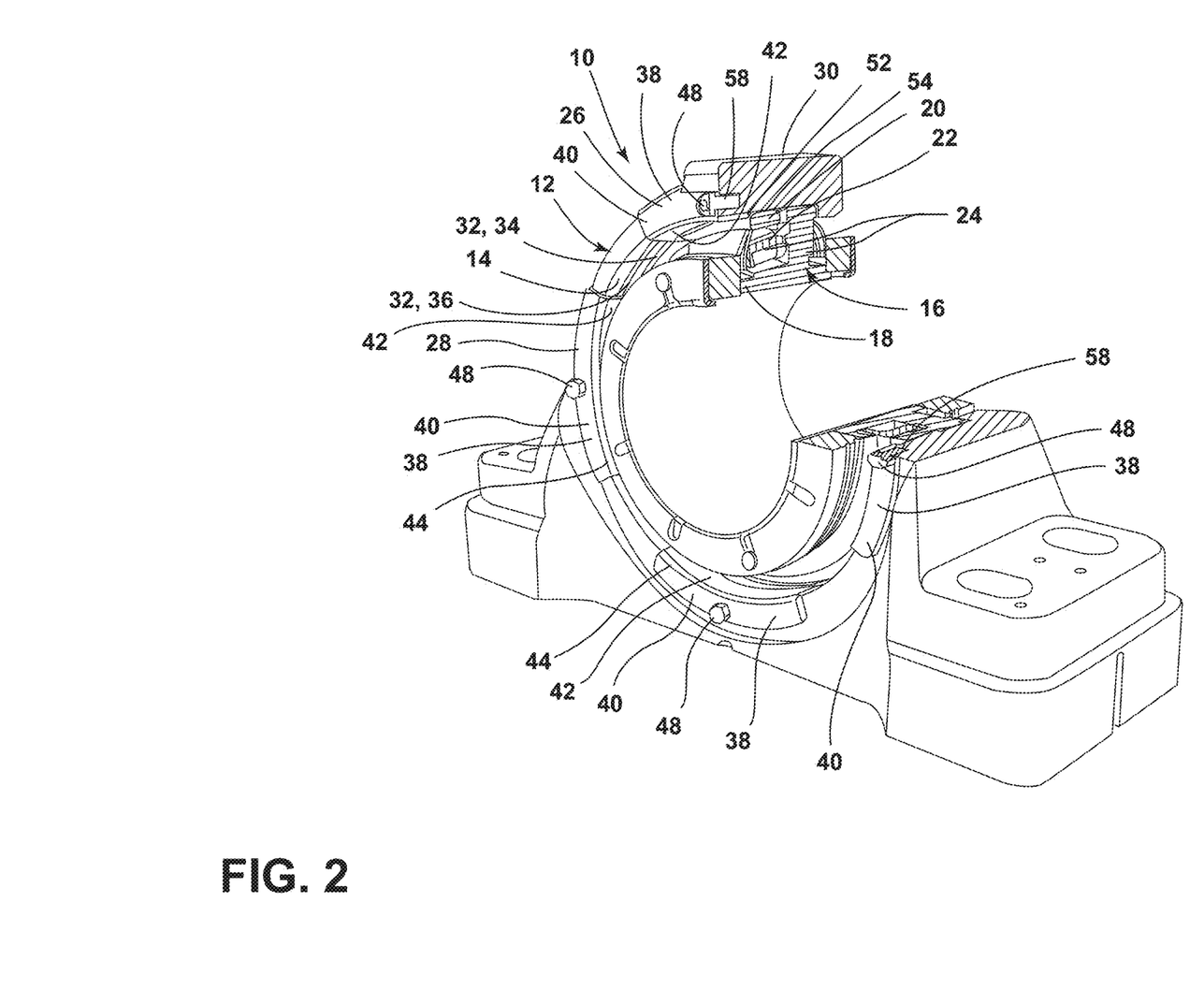
FIG. 2 is a top perspective view of a bearing assembly illustrating cross-sectional views of portions of the bearing assembly.
Figure 3:
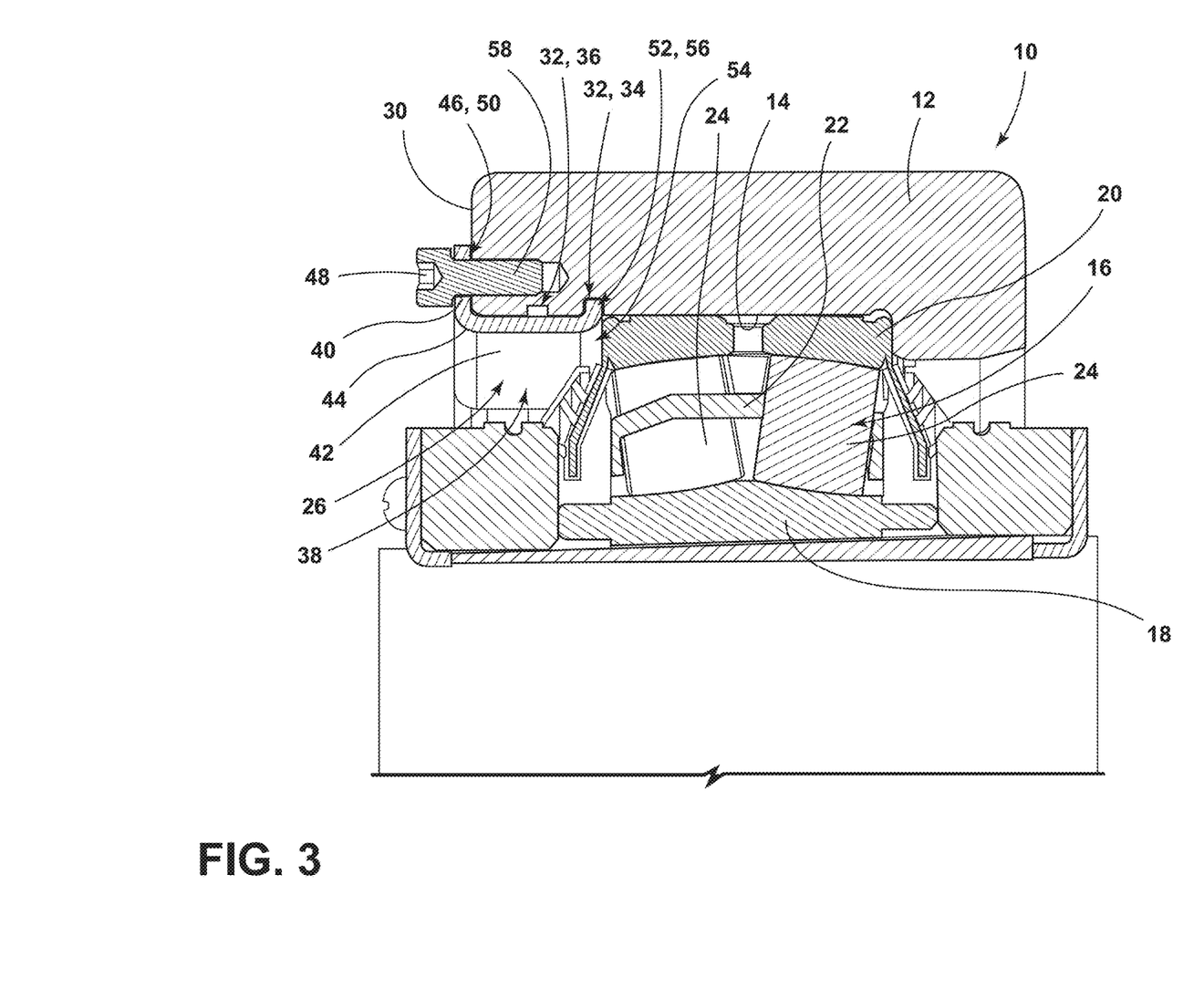
FIG. 3 is a cross-sectional view of the bearing assembly taken at line III-III of FIG. 1 illustrating a first retainer in an assembled condition.

Referring now to FIGS. 1-3, the bearing assembly 10 includes the housing 12. The housing 12 includes the annular interior portion 14. As illustrated in FIGS. 1 and 2, an outer portion 30 of the housing 12 extends radially outboard from the annular interior portion 14. In some implementations, the annular interior portion 14 of the housing 12 defines a channel 32. The annular interior portion 14 of the housing 12 can define a plurality of channels 32. For example, as illustrated in FIGS. 2 and 3, the annular interior portion 14 of the housing 12 defines a first channel 34 and a second channel 36 that is in an axially-spaced relationship with the first channel 34.

Referring still to FIGS. 1-3, the bearing assembly 10 includes the bearing 16. The bearing 16 is disposed radially inboard of the annular interior portion 14 of the housing 12. As discussed further herein, the bearing 16 is operable to move axially along the annular interior portion 14 of the housing 12. As illustrated in FIG. 2, the bearing 16 includes the inner ring 18, the outer ring 20, the cage 22 disposed radially between the inner and outer rings 18, 20, and the plurality of rolling elements 24 retained by the cage 22. The outer ring 20 is positioned radially outboard of the inner ring 18, and a shaft (not shown) is configured to be received within the inner ring 18. A variety of types of rolling elements 24 are contemplated (e.g., balls, rollers, needles, etc.). Further, the bearing 16 can be a variety of types of bearings (e.g., spherical bearing, ball bearing, roller bearing, etc.).

Figure 4:
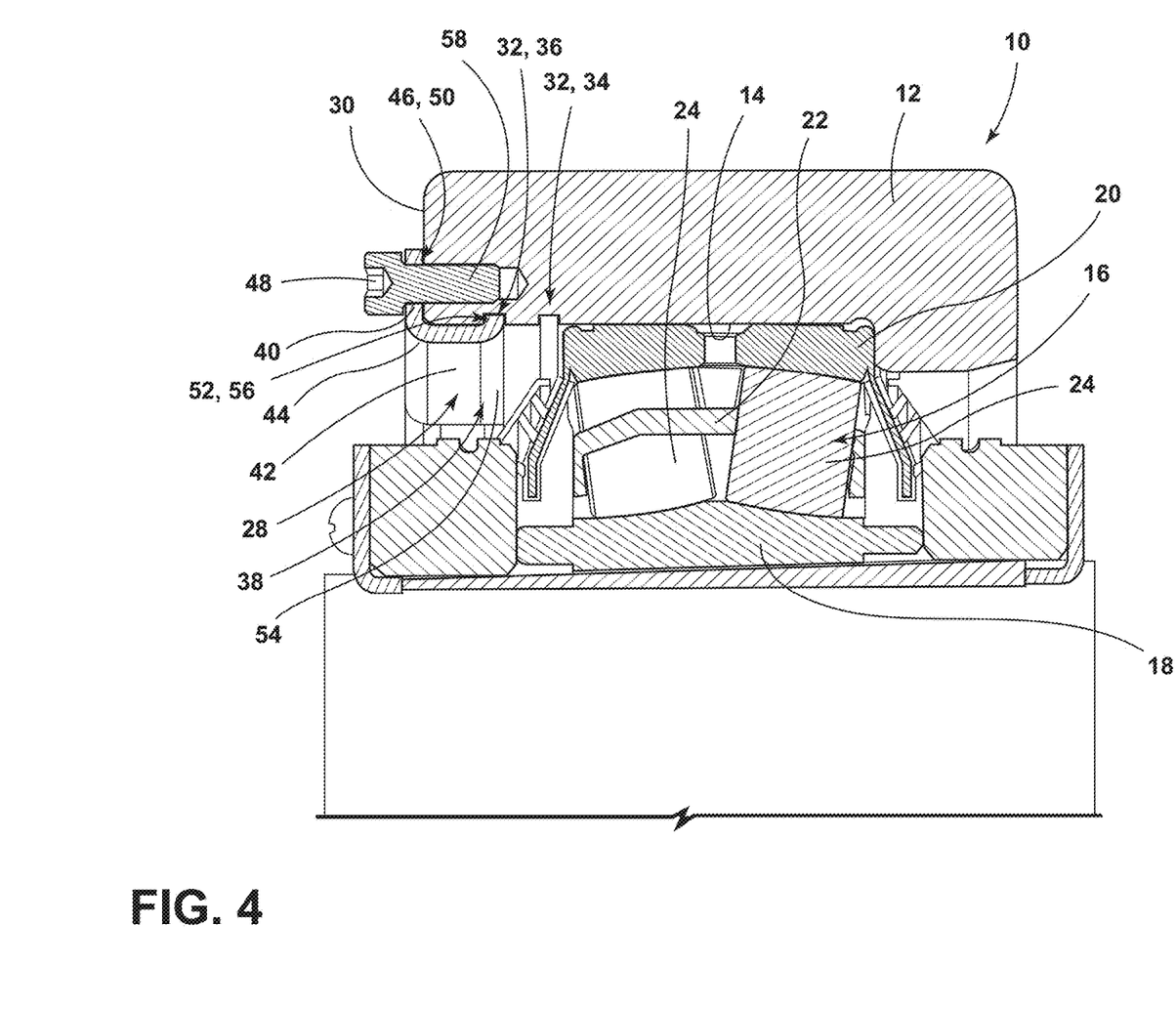
FIG. 4 is a cross-sectional view of the bearing assembly taken at line IV-IV of FIG. 1 rotated clockwise 90° and illustrating a second retainer in an assembled condition.

Referring now to FIGS. 1-4, the bearing assembly 10 includes a retainer 38. The retainer 38 is configured to limit axial displacement of the bearing 16 along the annular interior portion 14 of the housing 12 in the assembled condition of the retainer 38, as described further herein. The retainer 38 includes a first portion 40 and a second portion 42. As illustrated in FIGS. 3 and 4, the second portion 42 is adjacent to the first portion 40 and is coupled to the first portion 40 via a first corner 44. In various embodiments, the first and second portions 40, 42 of the retainer 38 meet at the first corner 44. The first portion 40 of the retainer 38 can define a receiver 46 for receiving a fastener 48 that is configured to fasten the first portion 40 of the retainer 38 to the housing 12 of the bearing assembly 10 in the assembled condition of the retainer 38. The receiver 46 can be an aperture 50 that extends through the first portion 40 of the retainer 38, as illustrated in FIGS. 3 and 4. A variety of types of receivers 46 for receiving the fastener 48 are contemplated (e.g., slot, recess, etc.).

Referring now to FIGS. 3 and 4, in some embodiments, the retainer 38 includes a third portion 52 that extends from the second portion 42 of the retainer 38 distally from the first portion 40. The third portion 52 can be adjacent to the second portion 42 and coupled to the second portion 42 via a second corner 54, as illustrated in FIGS. 3 and 4, wherein the third portion 52 and the second portion 42 meet at the second corner 54. In the illustrated embodiment, the third portion 52 is a tang 56 that extends from a portion of the second portion 42 of the retainer 38 that is distal from the first portion 40 of the retainer 38. In the embodiment illustrated in FIGS. 3 and 4, the tang 56 extends radially outboard from the second portion 42 of the retainer 38. It is contemplated that the tang 56 may extend radially inboard from the second portion 42, in some implementations. The first and second corners 44, 54 are illustrated as rounded corners in FIG. 3. It is contemplated that the first and second corners 44, 54 may be unrounded in various embodiments.

Referring now to FIGS. 2-5, the retainer 38 is operable between the assembled condition and the removed condition. In the assembled condition of the retainer 38, the retainer 38 is coupled to the housing 12. In some embodiments, the retainer 38 is fastened to the outer portion 30 of the housing 12 via the fastener 48 in the assembled condition of the retainer 38. As illustrated in FIGS. 3 and 4, the first portion 40 of the retainer 38 is fastened to the outer portion 30 of the housing 12 via the fastener 48. A variety of types of fasteners 48 for fastening the retainer 38 to the housing 12 are contemplated (e.g., screw, bolt, snap-fit, hook and loop, magnetic, adhesive fasteners, etc.). In the embodiment illustrated in FIG. 3, wherein the first portion 40 of the retainer 38 defines the aperture 50 and the fastener 48 includes a shaft 58, the shaft 58 of the fastener 48 extends axially through the aperture 50 and into the housing 12.

Referring still to FIGS. 2-5, in the assembled condition of the retainer 38, the retainer 38 extends axially along the annular interior portion 14 of the housing 12. In the embodiment illustrated in FIG. 3, the first portion 40 of the retainer 38 extends along the outer portion 30 of the housing 12, and the second portion 42 of the retainer 38 extends axially from the first portion 40 along the annular interior portion 14 of the housing 12. In some embodiments, in the assembled condition of the retainer 38, a portion of the retainer 38 is received within the channel 32 defined by the annular interior portion 14 of the housing 12. For example, as illustrated in FIGS. 3 and 4, the third portion 52 of the retainer 38, which forms the tang 56, extends from the second portion 42 of the retainer 38 radially outboard into the channel 32 defined by the annular interior portion 14 of the housing 12. The retainer 38 is configured to limit axial displacement of the bearing 16 along the annular interior portion 14 of the housing 12 in the assembled condition of the retainer 38. For example, contact between the outer ring 20 of the bearing 16 and the retainer 38 may limit further axial displacement of the bearing 16 in a direction toward the first corner 44 of the retainer 38.

Figure 5:
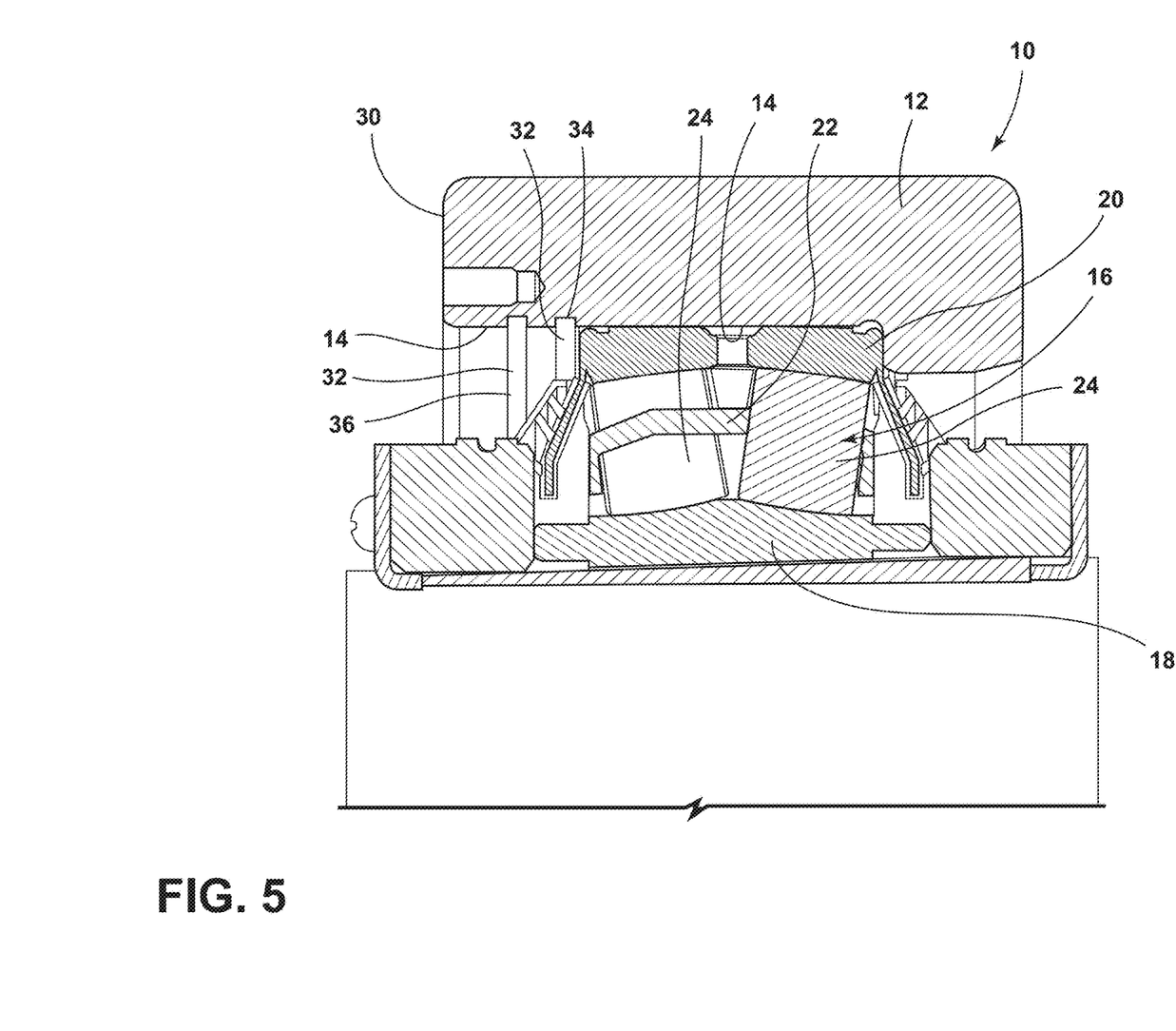
FIG. 5 is a cross-sectional view of the bearing assembly illustrating the absence of a retainer.

Referring now to FIG. 5, in the removed condition of the retainer 38, axial displacement of the bearing 16 along the annular interior portion 14 of the housing 12 is uninhibited by the retainer 38. For example, as illustrated in FIG. 5, wherein the housing 12 and bearing 16 are depicted while the retainer 38 is in the removed condition, axial displacement of the bearing 16 is uninhibited by the retainer 38.

Referring now to FIGS. 1-4, in various embodiments, the bearing assembly 10 can include a plurality of retainers 38. For example, in the embodiments illustrated in FIGS. 1 and 2, the bearing assembly 10 has four retainers 38, including the first retainer 26 that is illustrated exemplarily in FIG. 3 and the second retainer 28 that is illustrated exemplarily in FIG. 4. In an exemplary embodiment of the bearing assembly 10 that includes the first retainer 26 and the second retainer 28, the first retainer 26 is operable between an assembled condition, wherein the first retainer 26 is coupled to the housing 12, the first retainer 26 extends axially along the annular interior portion 14 of the housing 12 a first distance, and the first retainer 26 limits axial displacement of the bearing 16 along the annular interior portion 14 of the housing 12, and a removed condition, wherein axial displacement of the bearing 16 along the annular interior portion 14 of the housing 12 is uninhibited by the first retainer 26.

The second retainer 28 is operable between an assembled condition, wherein the second retainer 28 is coupled to the housing 12, the second retainer 28 extends axially along the annular interior portion 14 of the housing 12 a second distance, and the second retainer 28 limits axial displacement of the bearing 16 along the annular interior portion 14 of the housing 12, and a removed condition, wherein axial displacement of the bearing 16 along the annular interior portion 14 of the housing 12 is uninhibited by the second retainer 28.

In some implementations, the first axial distance is substantially equal to the second axial distance. In other words, the first and second retainers 26, 28 extend axially along the annular interior portion 14 of the housing 12 approximately the same distance. In some implementations, the first distance is greater than the second distance. For example, the first retainer 26, illustrated in FIG. 3, extends axially along the annular interior portion 14 of the housing 12 further than the second retainer 28, illustrated in FIG. 4, extends axially along the annular interior portion 14 of the housing 12. In some implementations, the first retainer 26 limits axial displacement of the bearing 16 in a first direction, and the second retainer 28 limits axial movement of the bearing 16 in the first direction. For example, the first and second retainers 26, 28 illustrated in FIGS. 3 and 4, respectively, are configured to limit axial displacement of the bearing 16 in the same direction. It is contemplated that the first retainer 26 can limit axial displacement of the bearing 16 in the first direction, and the second retainer 28 can limit axial displacement of the bearing 16 in a second direction that is opposite the first direction. In such embodiments, the first and second retainers 26, 28 may be positioned on opposite sides of the housing 12 while in their respective assembled conditions.

Referring still to FIGS. 3 and 4, the first retainer 26 can limit axial displacement of the bearing 16 along the annular interior portion 14 of the housing 12 to a first amount, and the second retainer 28 can limit axial displacement of the bearing 16 along the annular interior portion 14 of the housing 12 to a second amount. In some implementations, the first and second amounts can be substantially equal to each other. In some implementations, the second amount is greater than the first amount. For example, in the embodiment illustrated in FIGS. 3 and 4, the first retainer 26 extends axially along the annular interior portion 14 of the housing 12 a first distance, and the second retainer 28 extends axially along the annular interior portion 14 of the housing 12 a second distance that is less than the first distance in the respective assembled conditions of the first and second retainers 26, 28. Accordingly, axial displacement of the bearing 16 toward the first corner 44 of the first and/or second retainers 26, 28 in the first direction is limited to a first amount by the first retainer 26 and to a second amount by the second retainer 28, wherein the second amount is greater than the first amount.

The bearing assembly 10 of the present disclosure may provide a variety of advantages. First, the retainer 38 being fastened to the outer portion 30 of the housing 12 may provide for convenient removal of the retainer 38 from the assembled condition to the removed condition. Second, the bearing assembly 10 having a first retainer 26 that allows for a first amount of axial displacement of the bearing 16, and a second retainer 28 that allows for a second amount of axial displacement of the bearing 16 that is greater than the first amount, may allow a user to customize how much the bearing 16 is permitted to float within the housing 12 of the bearing assembly 10. Third, the bearing assembly 10 having the aforementioned first and second retainers 26, 28 initially in the assembled condition may eliminate the need for a user to both remove and reinstall an internal retention ring in order to adjust how much the bearing 16 is permitted to float within the housing 12.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 bearing assembly
12 housing
14 annular interior portion
16 bearing
18 inner ring
20 outer ring
22 cage
24 rolling elements
26 first retainer
28 second retainer
30 outer portion
32 channel
34 first channel
36 second channel
38 retainer
40 first portion
42 second portion
44 first corner
46 receiver
48 fastener
50 aperture
52 third portion
54 second corner
56 tang
58 shaft (of fastener)

What is claimed is:

1. A bearing assembly, comprising:
   a housing having an annular interior portion;
   a bearing disposed radially inboard of the annular interior portion and operable to move axially along the annular interior portion, comprising:
   an inner ring;
   an outer ring; and
   a plurality of rolling elements disposed radially between the inner and outer rings;
   a first retainer operable between an assembled condition, wherein the first retainer is coupled to the housing, the first retainer extends axially along the annular interior portion of the housing a first distance, and the first retainer limits axial displacement of the bearing along the annular interior portion of the housing, and a removed condition, wherein axial displacement of the bearing along the annular interior portion of the housing is uninhibited by the first retainer; and
   a second retainer operable between an assembled condition, wherein the second retainer is coupled to the housing, the second retainer extends axially along the annular interior portion of the housing a second distance that is less than the first distance, and the second retainer limits axial displacement of the bearing along the annular interior portion of the housing when the first retainer is in the removed condition, and a removed condition, wherein axial displacement of the bearing along the annular interior portion of the housing is uninhibited by the second retainer.

2. The bearing assembly of claim 1, wherein in the assembled condition of the first retainer, the first retainer limits axial displacement of the bearing along the annular interior portion of the housing in a first axial direction to a first amount, and in the assembled condition of the second retainer and the removed condition of the first retainer, the second retainer limits axial displacement of the bearing along the annular interior portion of the housing in the first axial direction to a second amount that is greater than the first amount.

3. The bearing assembly of claim 1, wherein the housing further comprises:
an outer portion that extends radially outboard from the annular interior portion, wherein the first retainer is fastened to the outer portion of the housing via a fastener in the assembled condition of the first retainer.

4. The bearing assembly of claim 3, wherein the first retainer comprises:
a first portion that defines a receiver for receiving the fastener that fastens the first retainer to the outer portion of the housing; and
a second portion that is adjacent to the first portion and coupled to the first portion via a first corner, wherein the second portion extends outward from the first corner in an axial direction along the annular interior portion of the housing.

5. The bearing assembly of claim 4, wherein the first retainer further comprises:
a tang that extends from the second portion distally from the first portion.

6. The bearing assembly of claim 5, wherein the tang extends radially outboard from the second portion of the first retainer.

7. The bearing assembly of claim 4, wherein the receiver is an aperture that receives a shaft of the fastener, wherein the shaft extends axially through the aperture.

8. A bearing assembly, comprising:
a housing having an annular interior portion that defines a first channel and an outer portion that extends radially outboard from the annular interior portion;
a bearing disposed radially inboard of the annular interior portion and operable to move axially along the annular interior portion, comprising:
an inner ring;
an outer ring; and
a plurality of rolling elements disposed radially between the inner and outer rings; and
a first retainer operable between an assembled condition, wherein a first portion of the first retainer extends along an outer portion of the housing, a second portion of the first retainer extends axially along the annular interior portion of the housing a first distance, and a third portion of the first retainer extends from the second portion into the first channel defined by the annular interior portion of the housing, such that the first retainer limits axial displacement of the bearing along the annular interior portion of the housing in a first direction to a first amount, and a removed condition, wherein axial displacement of the bearing along the annular interior portion of the housing in the first direction is uninhibited by the first retainer.

9. The bearing assembly of claim 8, wherein the first portion of the first retainer is fastened to the outer portion of the housing via a fastener.

10. The bearing assembly of claim 9, wherein the first portion meets the second portion at a first corner of the first retainer.

11. The bearing assembly of claim 8, further comprising:
a second retainer operable between an assembled condition, wherein the second retainer is fastened to the outer portion of the housing, the second retainer extends axially along the annular interior portion of the housing a second distance that is less than the first distance, and, in the removed condition of the first retainer, the second retainer limits axial displacement of the bearing along the annular interior portion of the housing in the first direction to a second amount that is greater than the first amount, and a removed condition, wherein axial displacement of the bearing along the annular interior portion of the housing in the first direction is uninhibited by the second retainer.

12. The bearing assembly of claim 11, wherein the annular interior portion of the housing defines a second channel that is in an axially-spaced relationship with the first channel, and wherein a portion of the second retainer is received within the second channel in the assembled condition of the second retainer.

13. A retainer for limiting axial movement of a bearing within a housing of a bearing assembly, comprising:
a first portion that defines a receiver for receiving a fastener that is configured to fasten the first portion to the housing of the bearing assembly;
a second portion that is adjacent to the first portion and coupled to the first portion via a first corner, the second portion being configured to extend outward from the first corner in an axial direction along an annular interior portion of the housing of the bearing assembly; and
a tang that extends from the second portion distally from the first portion.

14. The retainer of claim 13, wherein the tang is configured to extend radially outboard from the second portion of the retainer.

15. The retainer of claim 13, wherein the receiver is an aperture configured to receive a shaft of the fastener, wherein the shaft is configured to extend axially through the aperture.

* * * * *